(12) United States Patent
Van Oflen et al.

(10) Patent No.: US 12,420,909 B1
(45) Date of Patent: Sep. 23, 2025

(54) AIRFOIL ASSEMBLY HAVING A COMPOSITE SPAR

(71) Applicant: GENERAL ELECTRIC COMPANY, Evendale, OH (US)

(72) Inventors: Benjamin Thomas Van Oflen, Cincinnati, OH (US); Gary Willard Bryant, Jr., Loveland, OH (US); Tod Winton Davis, Cincinnati, OH (US); Li Zheng, Cohoes, NY (US); Tomas Muchenik, Cincinnati, OH (US); Daryl John Burford, Coleford (GB); Pawel Pres, Cheltenham (GB)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/069,332

(22) Filed: Mar. 4, 2025

(51) Int. Cl.
| | | |
|---|---|---|
| *B64C 11/04* | (2006.01) | |
| *F01D 5/14* | (2006.01) | |
| *F01D 5/28* | (2006.01) | |
| *F04D 29/34* | (2006.01) | |
| *F04D 29/38* | (2006.01) | |

(52) U.S. Cl.
CPC ............ *B64C 11/04* (2013.01); *F01D 5/147* (2013.01); *F01D 5/282* (2013.01); *F04D 29/34* (2013.01); *F04D 29/388* (2013.01); *F05D 2300/603* (2013.01)

(58) Field of Classification Search
CPC ......... B64C 11/04; B64C 11/06; B64C 11/20; B64C 11/22; B64C 11/24; B64C 11/30–44; F01D 5/147; F01D 5/282; F01D 5/30; F01D 7/00; F04D 29/322; F04D 29/34; F04D 29/38; F04D 29/388
See application file for complete search history.

(56) References Cited

U.S. PATENT DOCUMENTS

| | | | |
|---|---|---|---|
| 6,443,701 B1 | 9/2002 | Muhlabauer | |
| 8,845,270 B2 | 9/2014 | Nordstrom | |
| 9,145,776 B2 | 9/2015 | Mackie et al. | |
| 9,765,624 B2 | 9/2017 | Tajan et al. | |
| 11,981,418 B2 | 5/2024 | Cottet et al. | |
| 12,031,453 B1* | 7/2024 | Kray ................. | B64C 11/04 |
| 2003/0156944 A1* | 8/2003 | Rust .................. | B64C 11/26 |
| | | | 416/204 R |
| 2024/0384657 A1* | 11/2024 | Kray ................. | F01D 5/02 |

FOREIGN PATENT DOCUMENTS

| | | |
|---|---|---|
| CN | 108045559 A | 5/2018 |
| CN | 117508569 A | 2/2024 |
| GB | 491155 A | 8/1938 |

* cited by examiner

*Primary Examiner* — Christopher R Legendre
(74) *Attorney, Agent, or Firm* — McGarry Bair PC

(57) ABSTRACT

An airfoil assembly for a turbine engine having a composite spar, a sleeve, and a set of lobes. The composite spar includes an exterior spar portion, where at least part of the exterior spar portion of the composite spar is received at a sleeve inner surface of the sleeve. The set of lobes extends from the composite spar and is received by a set of recesses at the sleeve inner surface.

20 Claims, 7 Drawing Sheets

AIRFOIL ASSEMBLY HAVING A COMPOSITE SPAR

TECHNICAL FIELD

The disclosure generally relates to an airfoil assembly, and more specifically to an airfoil assembly having a trunnion and a spar.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section and the turbine section, respectively. The rotation of the rotating blades imparts mechanical stresses along various portions of the blade; specifically, where the blade is mounted to the disk.

In some turbine engines, a variable pitch airfoil can be included, which can be selectively rotated to adjust or otherwise tailor the flow of fluid over the variable pitch airfoil. The variable pitch airfoil is movable through use of a sleeve and a spar. The sleeve can have a rotation direction about a pitch axis, which in turn rotates the spar and the variable pitch airfoil. The sleeve is coupled to or otherwise formed with the spar.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
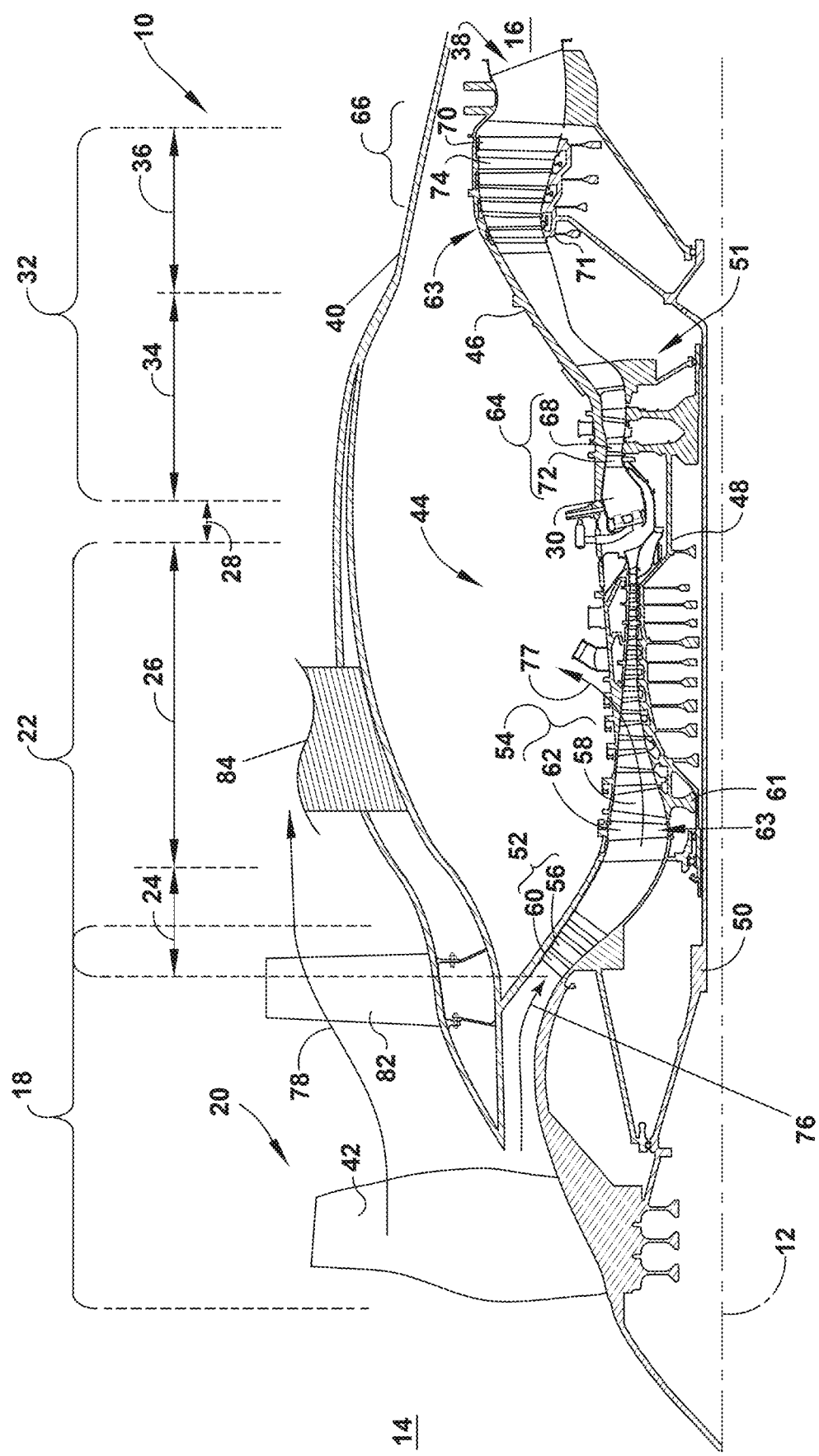
FIG. 1 is a schematic cross-sectional view of an unducted or open rotor turbine engine.

Aspects and advantages of the disclosure will be set forth in part in the following description, or may be obvious from the description, or may be learned through practice of the disclosure herein.

Traditionally, airfoils include a metal spar that is formed with or coupled to a metal sleeve.

Aspects of the disclosure herein are directed to an airfoil assembly for a turbine engine having an airfoil body with a composite spar, where a portion of the composite spar is received by a sleeve. The composite spar, at the portion received by the sleeve, can include a set of lobes. The set of lobes extend from the composite spar and are received by a set of recesses at an inner surface of the sleeve. The mechanical interlock between the composite spar lobes and the recesses of the sleeve provide improved coupling between the composite spar to the metal sleeve. The lobes can also transfer torque (e.g., changing airfoil pitch, changing atmospheric airflow, or impact event) applied to the airfoil body to the sleeve. This can extend the lifetime of the airfoil assembly.

The metal sleeve can be machined, cast or printed having the set of recesses at the sleeve inner surface. The airfoil body and composite spar are formed of composite material. A portion of the composite spar, prior to curing, can be received by the sleeve having the set of recesses. That is, a portion of the composite spar layup or portions of a multi-piece composite spar layup can be located in the metal sleeve prior to curing. The uncured composite spar material laid into the set of recesses can be for forming the set of lobes. Upon curing, the composite spar shape solidifies and the set of lobes located within the set of recesses provides an improved interface between the metal of the sleeve and the composite material of the spar.

Alternatively, in different and non-limiting examples, the composite spar can be cured with the set of lobes formed from additional material provided to the composite spar or machining of the composite spar. The set of lobes of the composite spar can then be received by the recesses of the metal sleeve to provide an interlock of the metal sleeve and the composite spar.

While illustrated and described herein as the composite spar having the set of lobes and the metal sleeve having the set of recesses, it is contemplated that the composite spar could include a set of recesses and the metal sleeve be cast or machined with a set of lobes. Therefore, it is within the scope of the disclosure that the set of lobes of the metal sleeve can be received by the recesses of the composite spar to provide an interlock of the metal sleeve and the composite spar.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The term "composite," as used herein is, is indicative of a material that does not include metal material. A composite can be a combination of at least two or more non-metallic elements or materials. Examples of a composite material can be, but not limited to, a polymer matrix composite material (PMC), a ceramic matrix composite (CMC), carbon fiber, polymeric resin, thermoplastic, bismaleimide (BMI), polyimide materials, epoxy resin, glass fiber, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

As used herein, the terms "additive manufacturing" and "additively manufactured" refer generally to manufacturing processes wherein successive layers of material or materials are provided on each other to build, i.e., layer-by-layer, a three-dimensional component. The successive layers generally fuse together to form a monolithic component which may have a variety of integral components. The additive manufacturing processes described herein may be used for forming components using any suitable material. For example, the material may be a plastic, metal, ceramic, polymer, epoxy, thermoplastic resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to titanium, iron, aluminum, stainless steel, and nickel alloys.

The terms "metallic" as used herein are indicative of a material that includes metal such as, but not limited to, titanium, iron, aluminum, stainless steel, and nickel alloys. A metallic material or alloy can be a combination of at least two or more elements or materials, where at least one is a metal.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" can be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" can be a gas or a liquid, or multi-phase.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

"Optional" or "optionally" means that the subsequently described event or circumstance may or may not occur, and that the description includes instances where the event occurs and instances where it does not.

As used herein, the term "radius of curvature" equals the radius of a circular arc which best approximates the curve at that point. A linear, or flat surface has a radius of curvature of zero. A curved surface, therefore, has a non-zero radius of curvature.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain exemplary embodiments of the present disclosure, an unducted or open rotor turbine engine includes a set of circumferentially spaced fan blades, which extend, exteriorly, beyond a nacelle encasing an engine core.

Turning to FIG. 1, a schematic cross-sectional diagram of an exemplary turbine engine 10 is shown in the form of an open rotor or unducted fan engine for an aircraft. The turbine engine 10 has a generally longitudinally extending axis or engine centerline 12 extending from a forward end 14 to an aft end 16. The turbine engine 10 includes, in a downstream serial flow relationship: a fan section 18 including a fan 20; a compressor section 22 including a booster or low pressure (LP) compressor 24 and a high pressure (HP) compressor 26; a combustion section 28 including a combustor 30; a turbine section 32 including an HP turbine 34 and an LP turbine 36; and an exhaust section 38.

An exterior surface, defined by a housing or nacelle 40, of the turbine engine 10 extends from the forward end 14 of the turbine engine 10 toward the aft end 16 of the turbine engine 10 and covers at least a portion of the compressor section 22, the combustion section 28, the turbine section 32, and the exhaust section 38. As shown, the fan section 18 is positioned at a forward portion of the nacelle 40 and also forward of the combustion section 28. It is contemplated that the fan section 18 can be positioned axially forward, aft, or in-line with the combustion section 28. That is, a pusher configuration is contemplated, where one or more propulsion devices or sections are located axially aft of the combustion section 28.

In the non-limiting example shown, the fan section 18 includes circumferentially spaced blades or propellers defining a set of rotatable fan blades 42 (also referred to herein as "set of fan blades 42"), as well as circumferentially spaced stationary airfoils defining a set of fan vanes 82. The set of fan vanes 82 can be positioned downstream of the set of fan blades 42. The set of fan blades 42 and the set of fan vanes 82 are disposed radially from and circumferentially about the engine centerline 12. It is also contemplated that multiple sets of fan blades 42 or multiple sets of fan vanes 82 can be provided, such as in an alternating arrangement with fan vanes disposed axially between fan blades in one example. It is further contemplated that the set of fan vanes 82 can rotate such that the set of fan blades 42 rotate in a first direction and the set of fan vanes 82 rotate in a second direction about the engine centerline 12.

The set of fan blades 42 can be mounted in a variety of ways. One such mounting is securing the blades to a central hub or disk, which can be driven by a gearbox of the engine. In an exemplary implementation, a disk can include one or more slots or receiving segments circumferentially spaced along a periphery of the disk and the airfoil assembly can include a trunnion that can couple to the disk at a receiving segment of the disk. In this manner, any suitable number of composite airfoil assemblies can be mounted circumferentially about the disk to collectively form a rotating assembly. Optionally, the airfoil assembly can include a trunnion with bearings that, when mounted, can allow or restrict rotation of the airfoil assembly within each of the receiving segments.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the turbine engine 10.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The HP and LP spools 48, 50 are rotatable about the engine centerline 12 and coupled to a set of rotatable elements, which collectively define a rotor 51.

It will be appreciated that the turbine engine 10 can be either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor section 22 are mounted to a disk 61, which is mounted to the corresponding one of the HP and LP spools 48, 50, with each stage having its own disk 61. The static compressor vanes 60, 62 for a stage of the compressor section 22 are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extend radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are mounted to the engine casing 46 in a circumferential arrangement.

Rotary portions of the turbine engine 10, such as the blades 56, 58, 68, 70 among the compressor section 22 and the turbine section 32 are also referred to individually or collectively as the rotor 51. As such, the rotor 51 refers to the combination of rotating elements throughout the turbine engine 10.

Complementary to the rotary portions, the stationary portions of the turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the turbine engine 10.

Alternatively, the rotor 51 can be a first rotor and the stationary portions of the turbine engine 10, such as the static vanes 60, 62, 72, 74 among the compressor section 22 and the turbine section 32 can be coupled to a second rotor located radially outward of the first rotor. The first rotor and the second rotor can rotate in opposite directions resulting in a counter rotating engine.

The nacelle 40 is operatively coupled to the turbine engine 10 and covers at least a portion of the engine core 44, the engine casing 46, the exhaust section 38, or a combination thereof. The nacelle 40 can extend axially forward such that a portion of the nacelle 40 overlays or covers a portion of the fan section 18 or a booster section of the turbine engine 10.

During operation of the turbine engine 10, a working airflow 76 enters the engine core 44, and an inlet airflow 78 flows past the fan section 18 over the nacelle 40. The inlet airflow 78 flows through the set of fan blades 42, over at least a portion of the set of fan vanes 82, and the nacelle 40 of the turbine engine 10. The inlet airflow 78 then flows past the set of fan vanes 82, following the curvature of the nacelle 40 and toward the exhaust section 38. At least some of the inlet airflow 78 merges with the working airflow 76 downstream of the exhaust section 38 of the turbine engine 10. In this manner, the working airflow 76 and the inlet airflow 78 collectively form an overall thrust of the turbine engine 10.

The working airflow 76 can be used for combustion within the engine core 44. More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the turbine engine 10.

A portion of the working airflow 76 can also be drawn as bleed air 77 (e.g., from the compressor section 22). The bleed air 77 provides an airflow to engine components for cooling. The temperature of the working airflow 76 exiting the combustor 30 is significantly increased with respect to the working airflow 76 within the compressor section 22. As such, cooling provided by the bleed air 77 can be used for operating of such engine components in heightened temperature environments or a hot portion of the turbine engine 10. In the context of a turbine engine, the hot portions of the engine are normally downstream of the combustor 30, especially the turbine section 32, with the HP turbine 34 being the hottest portion as it is directly downstream of the combustion section 28.

Figure 2:
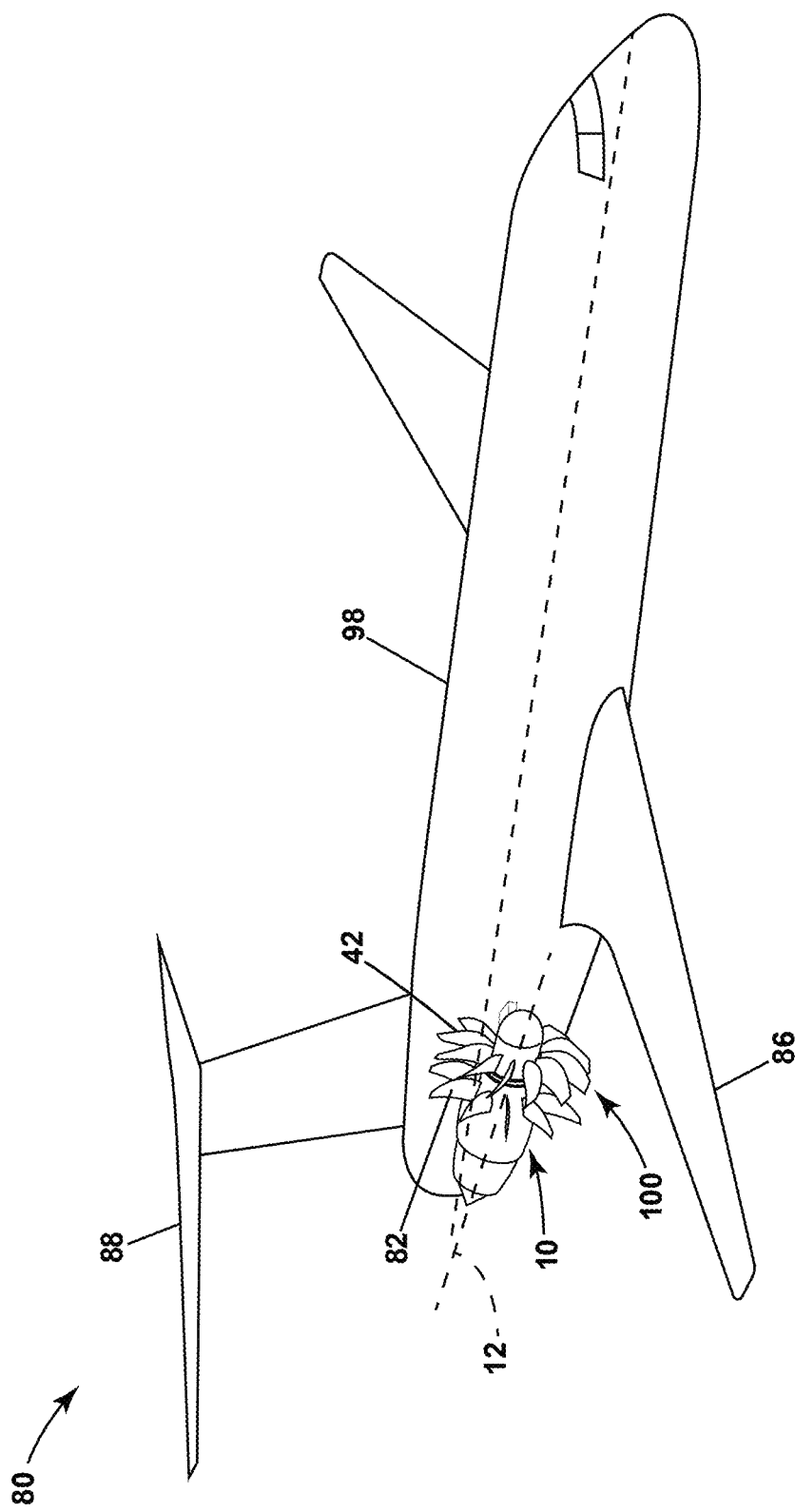
FIG. 2 is a schematic perspective view of an aircraft including the unducted or open rotor turbine engine of FIG. 1.

FIG. 2 illustrates one exemplary aircraft 80 having the turbine engine 10 of FIG. 1. The aircraft 80 can have any suitable form. As shown, the aircraft 80 includes a fuselage 98, with wings 86 and a tail wing 88 extending from the fuselage 98.

The turbine engine 10, having engine centerline 12, is shown with the set of fan blades 42 and the set of fan vanes 82. The turbine engine 10 includes at least one airfoil assembly 100. In the non-limiting example shown, the airfoil assembly 100 is provided in the set of fan blades 42, with it being understood that the airfoil assembly 100 can be provided in any suitable portion of the turbine engine 10, including a vane in one of the set of fan vanes 82, the set of static compressor vanes 60, 62, or the set of static turbine vanes 72, 74 (FIG. 1). In other non-limiting examples, the airfoil assembly 100 can blade from the compressor blades 56, 58 or the turbine blades 68, 70 (FIG. 1).

Figure 3:
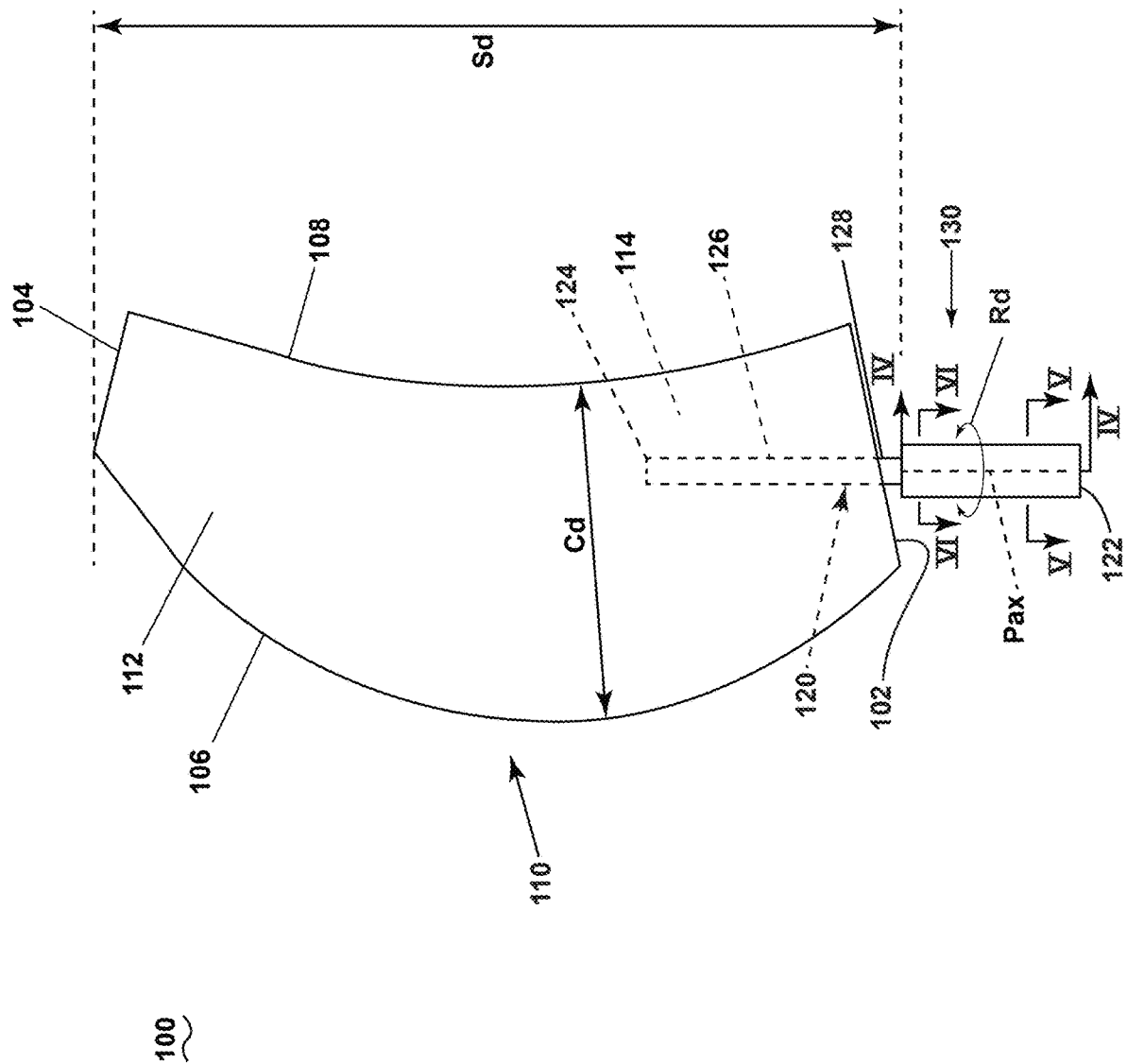
FIG. 3 is side view of an airfoil assembly of FIG. 2 including a composite spar and a sleeve in accordance with an exemplary embodiment of the present disclosure.

FIG. 3 is a schematic view illustrating the airfoil assembly 100 in one exemplary implementation. As shown, the airfoil assembly 100 can include at least an airfoil body 110, a composite spar 120, and a trunnion or a sleeve 130. The airfoil body 110 can be, by way of non-limiting example, a blade, a vane, an airfoil, or other component of any turbine engine, such as, but not limited to, a gas turbine engine, a turboprop engine, a turboshaft engine, or a turbofan engine.

The airfoil body 110 includes an outer wall 112 bounding an interior 114. The outer wall 112 extends between a root 102 and a tip 104 defining a spanwise direction (Sd). The outer wall 112 also extends between a leading edge 106 and a trailing edge 108 to define a chordwise direction (Cd).

The composite spar 120 extends between a first end 122 and a second end 124. An interior spar portion 126 of the composite spar 120 is located at the interior 114 of the airfoil body 110. The interior spar portion 126 can be coupled to the interior 114 through any suitable method such as, but not limited to, bonding, adhesion, fastening, or a combination thereof. An exterior spar portion 128 of the composite spar 120 extends outside or exterior of the airfoil body 110. The exterior spar portion 128 is received by the sleeve 130. While illustrated as having a space between the airfoil body 110 and sleeve 130, it is contemplated in a different and non-limiting example that one or more portions of the airfoil body 110 can be in contact with the composite spar 120.

While illustrated schematically as a rectangle, the composite spar 120 can have a varied geometric profile between the first end 122 and second end 124. For instance, the composite spar 120 can have a first geometric profile at the first end 122 transitioning to a second geometric profile at the second end 124. One or both of the first end 122 and the second end 124 can have a geometric profile that is cylindrical, flared, convex, concave, squared, asymmetric, or irregular.

The composite spar 120 can comprise polymeric material, thermoplastics, a ceramic matrix composite (CMC), a polymer matrix composite (PMC), bismaleimides (BMI), polyimides, metal matrix composites (MMC) or carbon fiber infused with metal fibers. In some examples, the composite spar 120 can include intertwined or braided fibers, where fibers can include single strands, fiber tows, woven fibers, braided fibers, twisted fibers, knitted fibers, yarns, or combinations thereof, that are arranged into twists and subsequently braided to form the composite spar 120.

At least part of the exterior spar portion 128 of the composite spar 120 is received within a hollow interior of the sleeve 130. In some examples, the exterior spar portion 128 can be held in place by frictional contact within the sleeve 130, bonding, adhesion, riveting, fasteners, or a combination thereof.

In some examples, the sleeve 130 can include metallic materials such as, but not limited to, titanium, iron, aluminum, stainless steel, or nickel. The sleeve 130 can be coupled or mounted to a rotatable disk, hub, or the like, and thus, can be for mounting the airfoil assembly 100 to such a rotatable disk, hub, or the like.

In a non-limiting example, the sleeve 130 can be for mounting the airfoil assembly 100 in a variable-pitch arrangement wherein the airfoil assembly 100 can be at least partially movable or adjustable in pitch with respect to an incoming airflow direction (e.g., parallel to the working airflow 76). As such, during operation of the airfoil assembly 100, the sleeve 130 can rotate about a pitch axis (Pax) in a rotational direction (Rd). As the composite spar 120 can couple the sleeve 130 to the airfoil body 110, rotation of the sleeve 130 about the rotational direction (Rd) can cause the airfoil body 110 to rotate about the pitch axis (Pax).

In another different and non-limiting example, the sleeve 130 can be for mounting the airfoil assembly 100 in a fixed arrangement wherein the airfoil assembly 100 can be stationary with respect to rotating about the pitch axis (Pax).

In yet another different and non-limiting example, the sleeve 130 can be for mounting the airfoil assembly 100 in a fixed arrangement such that the composite airfoil assembly forms a vane (e.g., a vane of the set of fan vanes 82).

Figure 4:
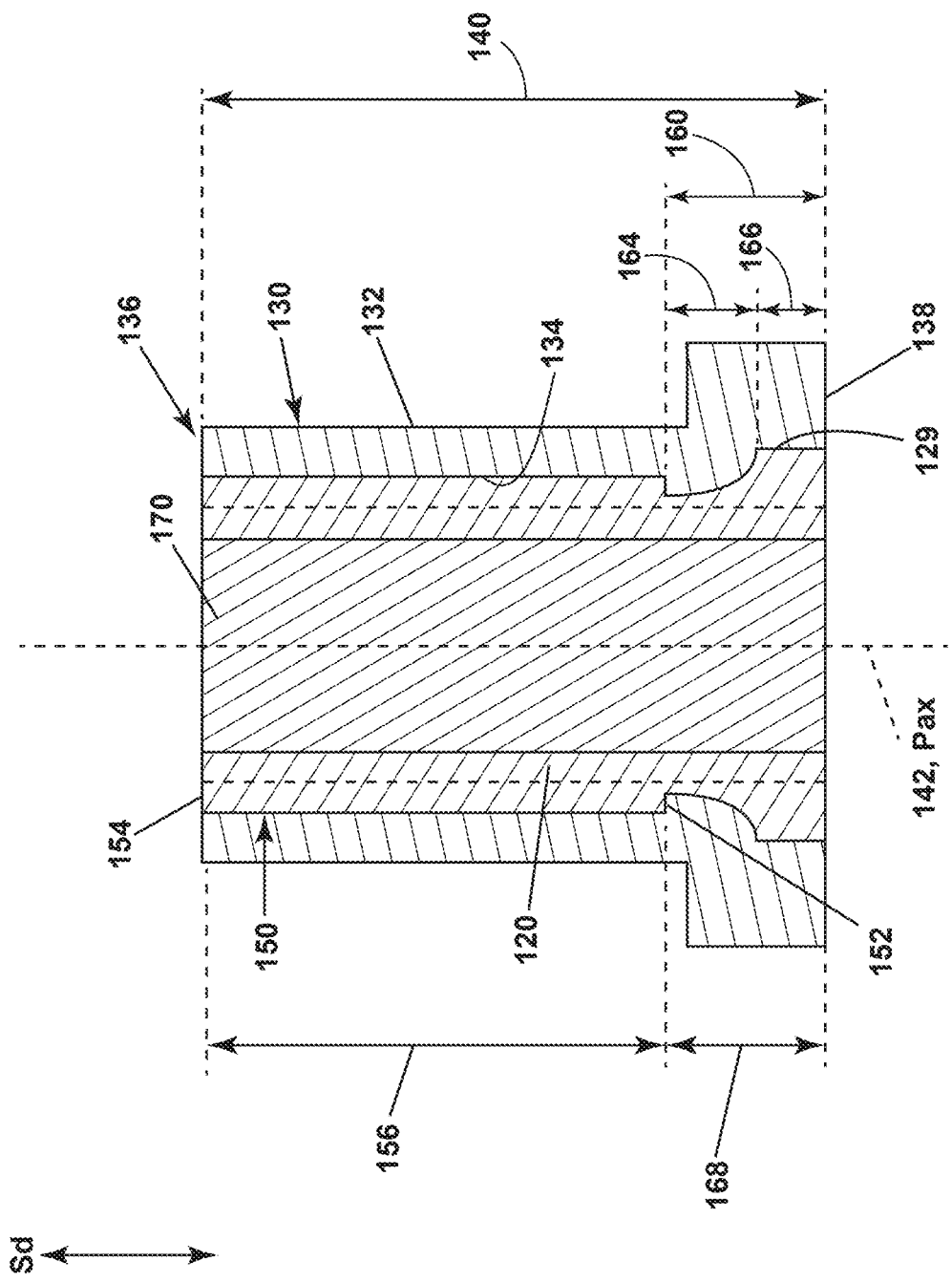
FIG. 4 is a schematic cross-sectional view of the airfoil assembly as seen from sectional line IV-IV of FIG. 3, further illustrating the sleeve and the composite spar in accordance with various aspects described herein.

Turning to FIG. 4, a schematic cross-section taken at the line IV-IV in FIG. 3 further illustrates the sleeve 130 and the composite spar 120. The sleeve 130 includes a sleeve outer surface 132 and a sleeve inner surface 134. A top portion 136 and a bottom portion 138 extend from the sleeve outer surface 132 to the sleeve inner surface 134. A sleeve length 140 can be measured from the bottom portion 138 to the top portion 136. A sleeve centerline 142 can be defined centrally within the sleeve 130 extending from the top portion 136 to the bottom portion 138. In some examples, the sleeve centerline 142 can be colinear with the pitch axis (Pax). The sleeve inner surface 134 can define a hollow interior of the sleeve 130 receiving at least part of the exterior spar portion 128 (FIG. 3) of the composite spar 120.

A set of lobes 150 can be formed with or located on the composite spar 120. The set of lobes 150 can comprise, for example, polymeric material, thermoplastics, a polymer matrix composite (PMC), bismaleimides (BMI), polyimides, metal matrix composites (MMC) or carbon fiber infused with metal fibers. The set of lobes 150 can be formed with one or more portions of the composite spar 120. Alternatively, in a different and non-limiting example, the set of lobes 150 can be formed by machining the composite spar or adding material to the composite spar.

The set of lobes 150 can be spaced about a central axis of the composite spar 120 or the sleeve centerline 142. The set of lobes 150 extend radially outward relative to the sleeve centerline 142. When the composite spar 120 is mounted to the sleeve 130, the set of lobes 150 radially extends away from the sleeve centerline 142 towards the sleeve outer surface 132. The set of lobes 150 can also extend in the spanwise direction (Sd) from a first lobe end 152 to a second lobe end 154.

A lobe length 156 can be measured in the spanwise direction (Sd) from the first lobe end 152 to the second lobe end 154. The lobe length 156 can be 10% or more of the sleeve length 140. That is, the lobe length 156 can be in a range of 10% to 120% of the sleeve length 140. For example, the lobe length 156 can be in a range of 10% to 90%, inclusive of the endpoints, of the sleeve length 140. Within this range, the set of lobes 150 can increase interlocking strength between the composite spar 120 and the sleeve 130 and can allow material different than that of the composite spar 120 to be received in the sleeve 130 that can improve strength and engagement (e.g., a shim, an adhesive, or a combination thereof) of the sleeve 130. Benefits of such a configuration include but are not limited to improved resistance to warping or bending in highly loaded regions of one or both of the composite spar 120 and the sleeve 130 and an increased transfer of torque between the composite spar 120 and the sleeve 130.

The composite spar 120 can include a base 160. The base 160 can extend from the bottom portion 138 of the sleeve 130 to the first lobe end 152. The base 160 can include a linear portion 166 where a spar exterior surface 129 of the composite spar 120 is parallel to the sleeve centerline 142.

Optionally, the base 160 can include a curved portion 164 adjacent to the linear portion 166. The curved portion 164 can be a portion of the spar exterior surface 129 that forms a concave shape or concave portion, as illustrated by way of example, or a convex shape relative to the sleeve centerline 142. The linear portion 166 can be a portion of the spar exterior surface 129 that is parallel to the sleeve centerline 142. While illustrated as having the curved portion 164 and the linear portion 166, it is contemplated that the base 160 can be one of the curved portion 164 or the linear portion 166. Further, any number of curves or linear portions in the base 160 are contemplated. The curved portion 164 of the base 160 can further improve engagement between the composite spar 120 and the sleeve 130.

A base length 168 can be measured in the spanwise direction (Sd) from the bottom portion 138 to the first lobe end 152. In some examples, the base length 168 is in a range of 2% to 50% of the sleeve length 140. Benefits associated with the base length 168 as described herein include improved load reaction and improved torque transfer between the composite spar 120 and the sleeve 130 under loading conditions.

Optionally, the composite spar 120 can include a core 170 encased with composite material. The core 170 can be a composite material or foam. The core 170 can extend from the first end 122 (FIG. 3) to the second end 124 (FIG. 3) or any portion of the length of the composite spar 120.

Figure 5:
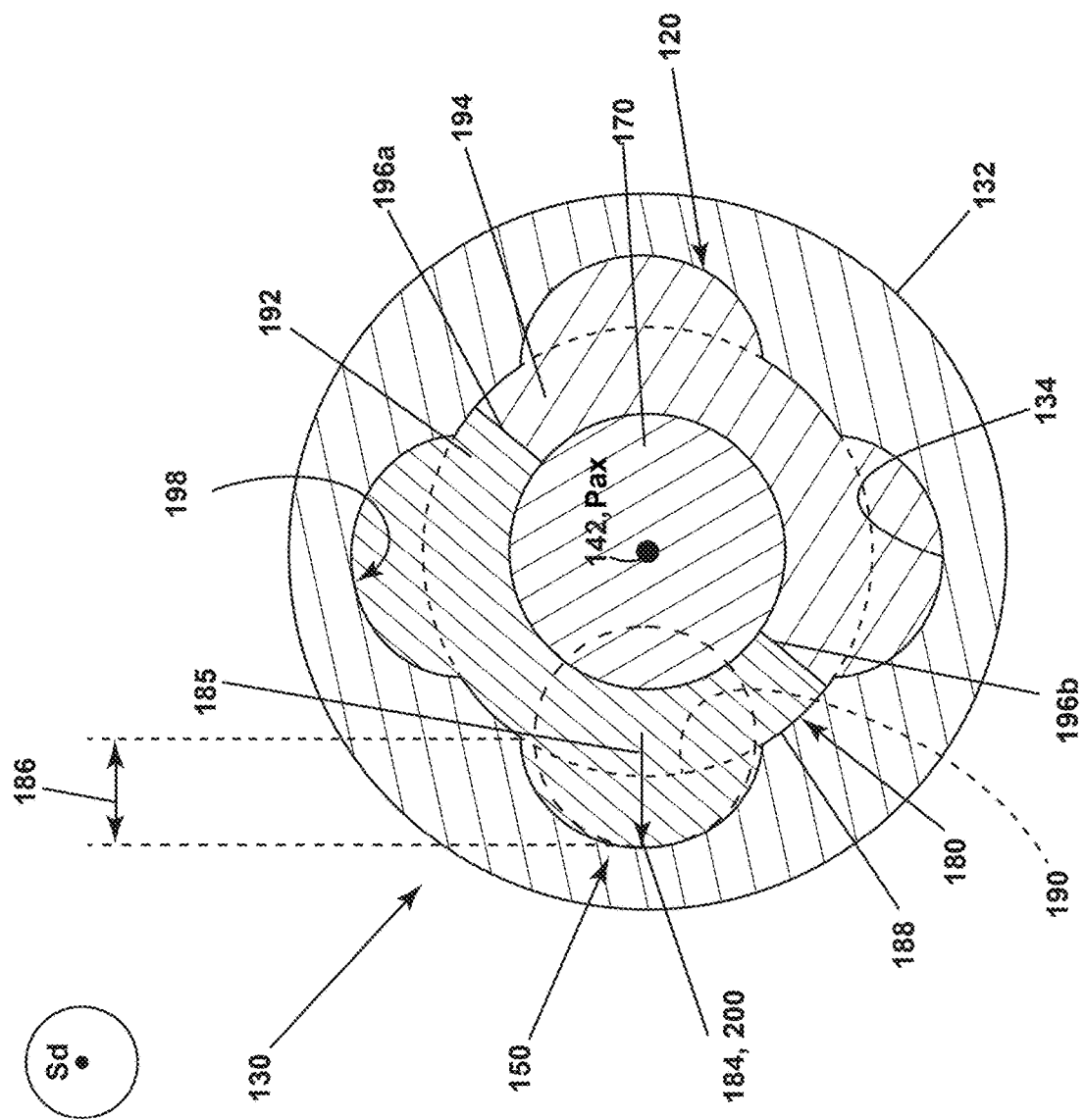
FIG. 5 is a schematic cross-sectional view of the airfoil assembly as seen from sectional line V-V of FIG. 3, further illustrating the sleeve and the composite spar in accordance with various aspects described herein.

FIG. 5 illustrates a cross-sectional view of the composite spar 120 and the sleeve 130 at a first position along the sleeve 130, such as from along the line V-V shown in FIG. 3. A set of troughs 180 can be in an alternating arrangement with the set of lobes 150 about the sleeve centerline 142 when the composite spar 120 is mounted to the sleeve 130. As such, a trough in the set of troughs 180 can be defined between two adjacent lobes in the set of lobes 150 that are spaced about the sleeve centerline 142.

The set of lobes 150 can include at least one lobe. As such, the set of troughs 180 can include a corresponding number of troughs. In some examples, the composite spar 120 includes a set of lobes 150 that can include at least four lobes. Benefits of such a configuration can include but are not limited to an increased surface area engageable with the sleeve inner surface 134. It is contemplated that the number of lobes in the set of lobes 150 can vary along the lobe length 156 (FIG. 3).

Each lobe in the set of lobes 150 can include a lobe peak 184. The lobe peak 184 of a lobe in the set of lobes 150 is an outermost point on the lobe. The outermost point is defined as a point farthest from the sleeve centerline 142 when the composite spar 120 is mounted to the sleeve 130. The distance from the sleeve centerline 142 can be measured perpendicularly from the sleeve centerline 142 to the lobe peak 184. A radius of curvature 185 for each lobe in the set of lobes 150 can be defined at the lobe peak 184 relative to the sleeve centerline 142. It is contemplated that the radius of curvature 185 of each lobe in the set of lobes 150 can be different.

Each trough of the set of troughs 180 includes an innermost point 188. The innermost point 188 is defined as the point of the trough closest to the sleeve centerline 142 when the composite spar 120 is mounted to the sleeve 130. The distance from the sleeve centerline 142 can be measured perpendicularly from the from the sleeve centerline 142 to the innermost point 188.

The innermost point 188 of each trough of the set of troughs 180 are connected to define a recessed arc 190. In a different and non-limiting example, the innermost points 188 of the set of troughs 180 of the composite spar 120 can be at varying distances to the sleeve centerline 142.

At any cross-section perpendicular to the sleeve centerline 142, such as the cross-section shown in FIG. 5, an extension length 186 of a lobe of the set of lobes 150 can be measured from the recessed arc 190 to the lobe peak 184. At some cross-sections, it is contemplated that the extension length 186 of one lobe in the set of lobes 150 can vary from an extension length of a different lobe in the set of lobes 150. Additionally or alternatively, it is contemplated that the extension length 186 of a lobe in the set of lobes 150 can change or vary along at least a portion of the lobe length 156 (FIG. 4) in the spanwise direction (Sd).

While each lobe in the set of lobes 150 and each trough in the set of troughs 180 are illustrated as having an arcuate (e.g., curved, circular, oval) cross-sectional shape, each lobe or trough can be at least partially defined by a variety of shapes including that of a polygonal (e.g., triangular, a rectangular, hexagonal, or the like) cross-sectional shape or include a combination of arcuate, linear, and polygonal cross-sectional shapes. It is contemplated that the cross-sectional shape of lobes in the set of lobes 150 and troughs in the set of troughs 180 can vary between any two locations along the lobe length 156 (FIG. 4).

While the set of lobes 150 are illustrated as being symmetrical and evenly-spaced about the sleeve centerline 142, the set of lobes 150 can be asymmetrical, unevenly-spaced, or utilize a combination thereof. Benefits of asymmetrical configurations of the set of lobes 150 can include but are not limited to an improved transition between ends of the set of lobes 150 and the composite spar 120.

The composite spar 120 can comprise one or more spar layups, where a layup can include one or more layers of a composite material. As illustrated, by way of a non-limiting example, the composite spar 120 can be a multi-piece composite spar layup and comprise at least a first spar layup 192 and a second spar layup 194 separate from the first spar layup 192, as shown. The first spar layup 192 and the second spar layup 194 can comprise the same material, same number of layers, same reinforcement material, or any combination thereof. However, it is contemplated in a different and non-limiting example that the first spar layup 192 and the second spar layup 194 can comprise different materials, different number of composite layers, different reinforcement material, or any combination thereof.

At least part of the first spar layup 192 and the second spar layup 194 can abut at a set of abutments 196a, 196b or split lines. The first spar layup 192 and the second spar layup 194 can be coupled by the set of abutments 196a, 196b through any suitable method such as, but not limited to, bonding, adhesion, fastening, or a combination thereof. The set of abutments 196a, 196b can extend from the first lobe end 152 (FIG. 4) to the second lobe end 154 (FIG. 4).

The set of lobes 150 can be formed by or located on one or both of the first spar layup 192 and the second spar layup 194. In a non-limiting example, the set of lobes 150 can be configured such that one or more abutments of the set of abutments 196a, 196b can be located at one or more lobes of the set of lobes 150. Additionally, or alternatively, one or more abutments of the set of abutments 196a, 196b can be located at one or more of the troughs of the set of troughs 180.

A set of recesses 198 can be machined, cast, or printed into the sleeve inner surface 134. The set of recesses 198 can be circumferentially spaced about the sleeve centerline 142.

Each recess in the set of recesses 198 can include a recess peak 200. The recess peak 200 of a recess in the set of recesses 198 is a point on the recess farthest from the sleeve centerline 142. When the composite spar 120 is mounted to the sleeve 130, the set of recesses 198 can contact at least a portion of the set of lobes 150 such that the recess peak 200 can align with the lobe peak 184.

The set of recesses 198 can include at least two recesses. In some examples, the set of recesses 198 can correspond to the number of lobes in the set of lobes 150, where each recess in the set of recesses 198 can receive a corresponding lobe in the set of lobes 150. During a change in pitch, normal operation, or during an impact event, torque can be applied to the composite spar 120. Benefits of the set of lobes 150 received by the set of recesses 198 include a transfer of torque from the set of lobes 150 of the composite spar 120 to the set of recesses 198 of the sleeve 130. This kind of torque transfer can improve the lifetime of the airfoil assembly 100. Benefits of the set of lobes 150 received by the set of recesses 198 can also include, but are not limited to, an increased surface area of the sleeve inner surface 134 engageable with the composite spar 120.

In some examples, the set of recesses 198 can include a greater number of recesses than lobes in the set of lobes 150. As such, recesses in the set of recesses 198 that do not receive a lobe in the set of lobes 150 can be provided with a material different than that of the composite spar 120 that can be wedged or applied to improve strength and engagement (e.g., a shim, a wedge, an adhesive, or a combination thereof).

The set of recesses 198 can extend from the first lobe end 152 (FIG. 4) to the second lobe end 154 (FIG. 4). As such, the set of recesses 198 can be spaced from the bottom portion 138 of the sleeve 130 (FIG. 4). In a different and non-limiting example, the set of recesses 198 can be a first set of recesses 198 and a second set of recesses (not shown) can be defined in the sleeve inner surface 134 separable from or unitarily formed with the first set of recesses 198. The second set of recesses can at least partially extend from the first lobe end 152 (FIG. 4) to the bottom portion 138 (FIG. 4) of the sleeve 130 and receive the base 160 (FIG. 4) of the composite spar 120.

During operation of the turbine engine 10, the set of recesses 198 defined by the sleeve inner surface 134 engage with the set of lobes 150 and interlocks the composite spar 120 and the sleeve 130. As such, when the sleeve 130 is mounted in the airfoil assembly 100 (FIG. 3), torque (e.g., changing airfoil pitch, changing atmospheric airflow, or impact event) readily transfers between the sleeve 130 to the composite spar 120 and the airfoil assembly 100 (FIG. 3) is appropriately held stationary (e.g., as a vane), or rotated about an axis (e.g., as a variable-pitch airfoil or non-variable-pitch airfoil).

Figure 6:
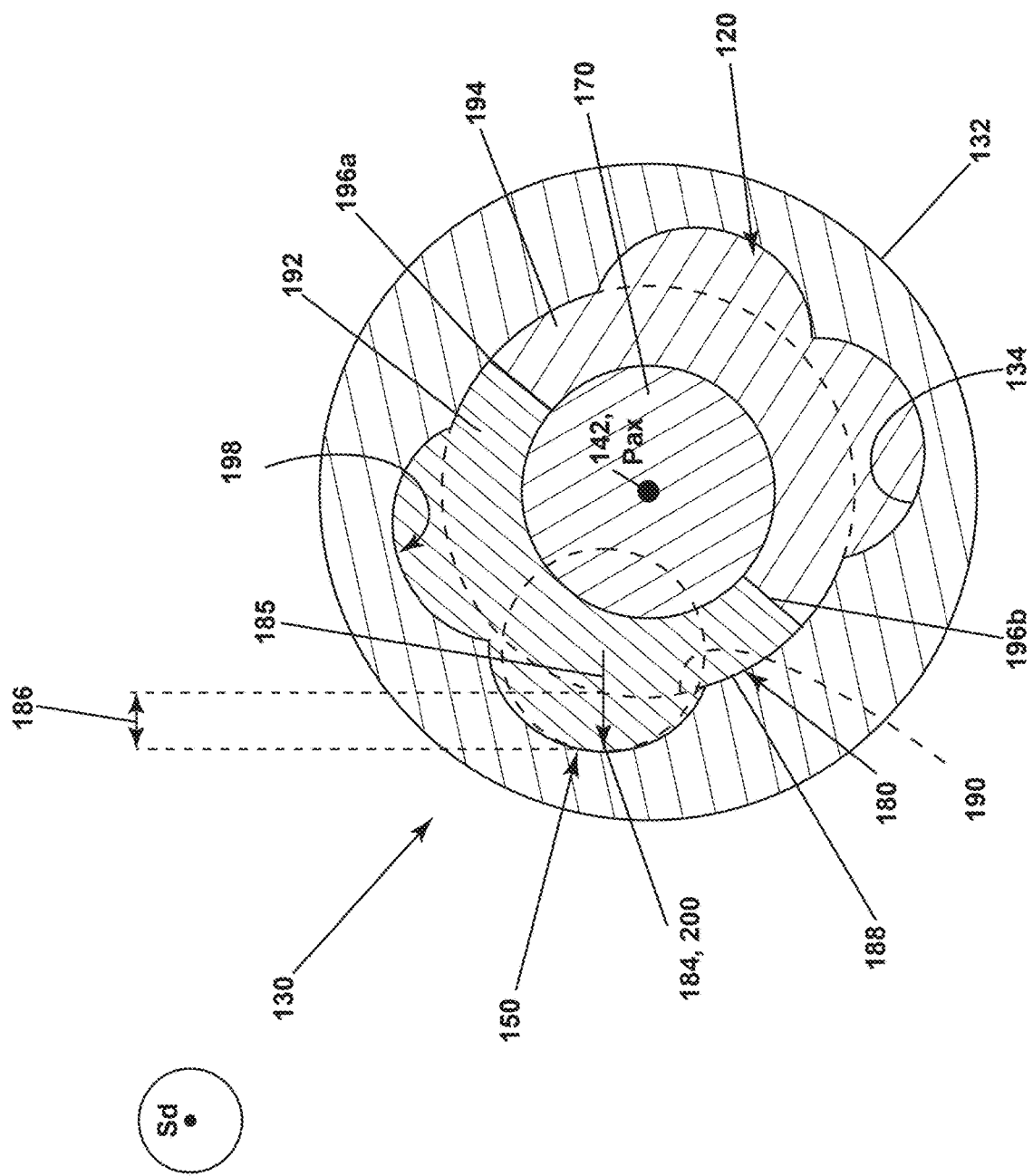
FIG. 6 is a schematic cross-sectional view of the airfoil assembly as seen from sectional line IV-IV of FIG. 3, further illustrating the sleeve and the composite spar in accordance with various aspects described herein.

FIG. 6 illustrates a cross-sectional view of the composite spar 120 and the sleeve 130 at a second position, such as from along the line VI-VI shown in FIG. 3. While illustrated as located along the sleeve 130 between the first position (line V-V) and the second end 124 (FIG. 3), the second position can be at any location radially outward from the first position (line V-V) to one of the first lobe end 152 (FIG. 4)

or the second lobe end 154 (FIG. 4). In some examples, the second position can be located the second lobe end 154 (FIG. 4).

While the composite spar 120 is mounted to the sleeve 130 similar to FIG. 5, FIG. 6 illustrates an exemplary configuration for the set of lobes 150 where at least a portion of two lobes of the set of lobes 150 overlap to form an overlapping configuration. As such, at least one lobe in the set of lobes 150 can include a changing radius of curvature 185 along the lobe length 156 (FIG. 4). In some examples, two lobes of the set of lobes 150 can overlap at one of the first lobe end 152 and the second lobe end 154 (FIG. 4) such that two lobes conform to one lobe in the set of lobes 150. Additionally, or alternatively, conformed lobes in the set of lobes 150 can gradually blend into a shape of the composite spar 120. Put another way, the radius of curvature 185 of one or more lobes in the set of lobes 150 can correspond to a radius of curvature of the composite spar 120 at one of the first lobe end 152 or the second lobe end 154. Benefits of such configurations can include improved transition between ends of the set of lobes 150 and the composite spar 120. Improved transition, in turn, can reduce mismatch between ends of the set of lobes 150 and the composite spar 120 and improve a resistance to deformation or cracking at adjoined portions of the set of lobes and the composite spar 120.

The extension length 186 of a lobe in the set of lobes 150 illustrated in FIG. 6 can be different from the extension length 186 of a lobe in the set of lobes 150 measured at other positions along the sleeve (e.g., the first position illustrated in FIG. 5). Put another way, the extension length 186 can vary along the lobe length 156 (FIG. 4). In some examples, extension lengths 186 of lobes in the set of lobes 150 illustrated in FIG. 6 can be smaller than extension lengths 186 of lobes in the set of lobes 150 illustrated in FIG. 5. As such, the set of lobes 150 can at least partially have a tapered configuration in the spanwise direction (Sd). Further, this configuration can include one or both of the first lobe end 152 (FIG. 4) to the second lobe end 154 (FIG. 4) having lobes where the extension length 186 is zero. In other words, the set of lobes 150 can extend in the spanwise direction (Sd) from the first lobe end 152 (FIG. 4) to gradually blend or disappear second lobe end 154 (FIG. 4) into the composite spar 120. Such a configuration can be utilized alternatively or in addition to an overlapping configuration of lobes in the set of lobes 150 and can further improve transition between ends of the set of lobes and the composite spar 120.

While the set of lobes 150 are illustrated as pairs of arcuate (e.g., curved, circular, oval) cross-sectional shaped lobes in an overlapping configuration, it is contemplated that the set of lobes 150 can be at least partially defined by a variety of shapes including that of a polygonal (e.g., triangular, a rectangular, hexagonal, or the like) cross-sectional shape or include a combination of arcuate, linear, and polygonal cross-sectional shapes. As such, it is further contemplated that the cross-sectional shape of lobes in the set of lobes 150 can vary between any two locations along the sleeve 130. Put another way, in some examples, the set of lobes 150 can have a polygonal cross-sectional shape at a first position (FIG. 5) and transition to have arcuate cross-sectional shaped lobes in the second position, as shown in FIG. 6.

Figure 7:
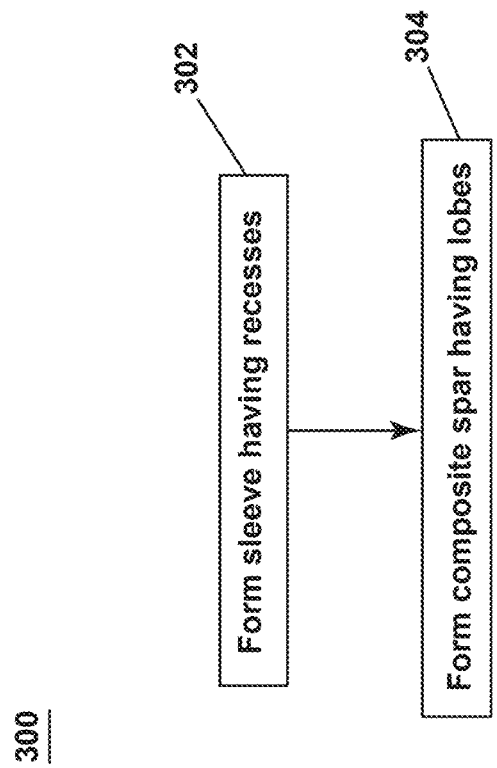
FIG. 7 is a flowchart illustrating an exemplary method of forming an airfoil assembly.

FIG. 7 is a method 300 of forming an airfoil assembly 100 for a turbine engine (e.g., turbine engine 10) of FIGS. 3-6. At step 302, the sleeve 130 can be formed from one or more metal materials. The sleeve 130 includes the sleeve outer surface 132 and the sleeve inner surface 134. The set of recesses 198 are located at the sleeve inner surface 134. The set of recesses 198 can be cast as part of the sleeve 130, formed with the sleeve 130 during additive manufacturing, or machined into the sleeve 130.

At step 304, the composite spar 120 can be formed by laying up composite material to create one or more spar layups. The composite spar 120 can be a multi-piece composite spar layup and include at least one or more spar layups. As such, the composite spar 120 is illustrated by way of example, as including the first spar layup 192 and the second spar layup 194. The first spar layup 192 and the second spar layup 194 can be assembled to form the composite spar 120 and define the set of abutments 196a, 196b. The first spar layup 192 and the second spar layup 194 can be coupled at the set of abutments 196a, 196b. Optionally, the composite spar 120 includes a core 170 formed of composite material or foam encased with composite material.

The set of lobes 150 can be formed by laying portions of the composite material within the set of recesses 198 of the sleeve 130. In some examples, uncured material of the composite spar 120 is laid into the set of recesses 198, where the set of recesses 198 shapes the composite spar 120 and forms the set of lobes 150. Upon curing, the composite spar 120 solidifies and the set of lobes 150 located within the set of recesses 198 provides an improved interface between the metal material of the sleeve 130 and the composite material of the composite spar 120.

In a different and non-limiting example, the composite spar 120 is cured or partially cured prior to forming the set of lobes 150. As such, the set of lobes 150 can be formed by providing additional composite material to the composite spar 120 that cures and/or couples to the composite spar 120.

In another different and non-limiting example, the composite spar 120 is cured or partially cured prior to forming the set of lobes 150. As such, the set of lobes 150 can be formed by removing material from the composite spar 120 (e.g., machining).

Optionally, material different than that of both the composite spar 120 and the set of lobes 150 can be provided to one or more recesses in the set of recesses 198 (e.g., a shim, an adhesive, or a combination thereof) that can improve strength and engagement between the sleeve 130 and the composite spar 120.

Benefits associated with the composite spar as described herein include an increased bond strength between the composite spar and the sleeve. Additional benefits include improved torque transfer from the composite spar to the metal sleeve under loading conditions due to the set of lobes of the composite spar located in the set of recesses of the sleeve.

Additional benefits include a redundant load path, where a load is received by more than just an adhesive bond. This additional load path essentially takes a shear load between the composite spar and the trunnion or metal sleeve and converts it to a circumferential load in the fibers of the composite wrap or composite body.

Yet another benefit is the improved bonding between composite material and metallic material, as the set of lobes secures the composite spar to the sleeve. Curing the composite lobes within the metal recesses can further improve the coupling of the composite spar and metallic sleeve. The improved bonding can secure the composite material and metallic material in the absence of adhesive. The improved bonding can also secure the composite material and metallic material during an ingestion event or other high loading event.

It will be appreciated that the sleeves and the composite spars, including aspects thereof, as discussed herein are provided by way of example only and that in other exemplary embodiments, the sleeves and the composite spars may have any other suitable configurations. For example, the sleeve can be machined, cast or printed having the set of lobes at the sleeve inner surface and the set of lobes can shape the composite spar correspondingly.

Further aspects of the disclosure are provided by the subject matter of the following clauses:

An airfoil assembly for a turbine engine, the airfoil assembly comprising: an airfoil body comprising an outer wall bounding an interior, the outer wall extending between a leading edge and a trailing edge in a chordwise direction, and between a root and a tip in a spanwise direction; a composite spar having an interior spar portion located at the interior of the airfoil body and an exterior spar portion exterior of the airfoil body; a sleeve having a sleeve outer surface and a sleeve inner surface, wherein a top portion and a bottom portion extend from the sleeve outer surface to the sleeve inner surface, wherein at least part of the exterior spar portion of the composite spar is received at the sleeve inner surface, a sleeve length measured in the spanwise direction from the bottom portion to the top portion; and a set of lobes extending from the composite spar received by a set of recesses at the sleeve inner surface, wherein the set of lobes include a lobe length measured in the spanwise direction from a first lobe end to a second lobe end, wherein the lobe length is 10% or more of the sleeve length.

The airfoil assembly of any proceeding clause, wherein each lobe of the set of lobes includes an extension length measured from a recessed arc to a lobe peak.

The airfoil assembly of any proceeding clause, wherein the extension length changes along the lobe length.

The airfoil assembly of any proceeding clause, wherein the set of lobes has a tapered configuration where the extension length is zero at one of the first lobe end or the second lobe end.

The airfoil assembly of any proceeding clause, further comprising a set of troughs circumferentially spaced about the composite spar, wherein each trough of the set of troughs is defined between two adjacent lobes of the set of lobes.

The airfoil assembly of any proceeding clause, wherein the set of troughs define, in part, the recessed arc.

The airfoil assembly of any proceeding clause, wherein at least one lobe of the set of lobes includes a changing radius of curvature along the lobe length.

The airfoil assembly of any proceeding clause, wherein the at least one lobe of the set of lobes corresponds to a radius of curvature of the composite spar at one of the first lobe end or the second lobe end.

The airfoil assembly of any proceeding clause, wherein at least a portion of two lobes of the set of lobes overlaps.

The airfoil assembly of any proceeding clause, wherein the first lobe end is spaced from the bottom portion of the sleeve.

The airfoil assembly of any proceeding clause, wherein the composite spar includes a base extending from the bottom portion to the first lobe end.

The airfoil assembly of any proceeding clause, wherein the base includes a concave portion.

The airfoil assembly of any proceeding clause, wherein the sleeve defines a sleeve centerline and the base of the composite spar includes a linear portion, wherein an exterior of the composite spar is parallel to the sleeve centerline.

The airfoil assembly of any proceeding clause, wherein base length is measured from a bottom of the bottom portion to the first lobe end and wherein the base length is in a range of 2%-50% of the sleeve length.

The airfoil assembly of any proceeding clause, wherein the sleeve comprises a metallic material.

The airfoil assembly of any proceeding clause, wherein the airfoil body includes a polymer matrix composite material.

The airfoil assembly of any proceeding clause, wherein the set of lobes includes at least two lobes.

The airfoil assembly of any proceeding clause, wherein the set of lobes includes at least two lobes.

The airfoil assembly of any proceeding clause, wherein the composite spar has a first spar layup and a second spar layup separate from the first spar layup, wherein at least part of the first spar layup and the second spar layup abut.

The airfoil assembly of any proceeding clause, wherein the first spar layup and the second spar layup comprise the same material.

The airfoil assembly of any proceeding clause, wherein an abutment is defined where the at least part of the first spar layup and the second spar layup abut, and the abutment is located at a lobe in the set of lobes.

The airfoil assembly of any proceeding clause, wherein the first spar layup and a second spar layup comprise the same material.

The airfoil assembly of any proceeding clause, wherein a cross-sectional shape of at least one lobe in the set of lobes varies along the lobe length.

The airfoil assembly of any proceeding clause, wherein a number of recesses in the set of recesses is greater than a number of lobes in the set of lobes.

The airfoil assembly of any proceeding clause, wherein a material different than that of the composite spar is wedged in at least one recess in the set of recesses.

The airfoil assembly of any proceeding clause, wherein the set of lobes is additively manufactured to the composite spar.

The airfoil assembly of any proceeding clause, wherein the set of lobes is asymmetrical about the sleeve centerline.

The airfoil assembly of any proceeding clause, wherein each recess in the set of recesses receives a corresponding lobe in the set of lobes.

The airfoil assembly of any proceeding clause, wherein the set of recesses is a first set of recesses and the sleeve inner surface further has a second set of recesses extending from the bottom portion to the first lobe end and receives the base.

A method of forming an airfoil assembly for a turbine engine, the airfoil assembly comprising an airfoil body, a composite spar, and a metallic sleeve, the method comprising: forming a metallic sleeve having a sleeve outer surface and an sleeve inner surface, wherein the sleeve inner surface includes a set of recesses spaced from a bottom portion of the metallic sleeve; receiving at the set of recesses of the metallic sleeve a composite material; and curing the composite material received by the metallic sleeve to define a composite spar, wherein the composite spar includes a set of lobes located within the set of recesses at an sleeve inner surface, wherein the set of lobes include a lobe length measured in the spanwise direction from a first lobe end to a second lobe end, wherein the lobe length is in a range of 10%-90%, inclusive of endpoints of a sleeve length measured from a top portion of the metallic sleeve to the bottom portion of the metallic sleeve.

The method of any proceeding clause, wherein the forming the metallic sleeve includes using more than one metal materials in the metallic sleeve.

The method of any proceeding clause, wherein the receiving the composite material includes laying up composite material in the metallic sleeve and forming one or more spar layups.

The method of any proceeding clause, wherein the receiving the composite material includes laying up composite material in the metallic sleeve and forming at least a first spar layup and a second spar layup.

The method of any proceeding clause, wherein the receiving the composite material includes the set of recesses shaping both the composite spar and the set of lobes.

The method of any proceeding clause, wherein the receiving the composite material includes receiving, in the metallic sleeve, the composite spar that is cured or partially cured and adding additional composite material to the metallic sleeve to shape the set of lobes.

The method of any proceeding clause, wherein the curing the composite material includes partially curing the composite spar prior to forming the set of lobes.

The method of any proceeding clause, wherein the curing the composite material includes solidifying both the composite spar and the set of lobes.

The method of any proceeding clause, wherein, after the curing the composite material, the method further includes forming the set of lobes by removing material from the composite spar.

A turbine engine comprising: a fan section, a compressor section, a combustion section, and a turbine section in serial flow arrangement, and defining an engine centerline, and an airfoil assembly rotatable about the engine centerline, the airfoil assembly comprising: an airfoil body comprising an outer wall bounding an interior, the outer wall extending between a leading edge and a trailing edge in a chordwise direction, and between a root and a tip in a spanwise direction; a composite spar having an interior spar portion located at the interior of the airfoil body and an exterior spar portion exterior of the airfoil body; a sleeve having a sleeve outer surface and a sleeve inner surface, wherein at least part of the exterior spar portion of the composite spar is received at the sleeve inner surface, and wherein a top portion and a bottom portion extend from the sleeve outer surface to the sleeve inner surface, a sleeve length measured in the spanwise direction from the bottom portion to the top portion, and a set of lobes extending from the composite spar received by a set of recesses at the sleeve inner surface, wherein the set of lobes include a lobe length measured in the spanwise direction from a first lobe end to a second lobe end, wherein the lobe length is 10% or more of the sleeve length.

The turbine engine of any proceeding clause, wherein each lobe of the set of lobes includes an extension length measured from a recessed arc to a lobe peak.

The turbine engine of any proceeding clause, wherein the extension length changes along the lobe length.

The turbine engine of any proceeding clause, wherein the set of lobes has a tapered configuration where the extension length is zero at one of the first lobe end or the second lobe end.

The turbine engine of any proceeding clause, further comprising a set of troughs circumferentially spaced about the composite spar, wherein each trough of the set of troughs is defined between two adjacent lobes of the set of lobes.

The turbine engine of any proceeding clause, wherein the set of troughs define, in part, the recessed arc.

The turbine engine of any proceeding clause, wherein at least one lobe of the set of lobes includes a changing radius of curvature along the lobe length.

The turbine engine of any proceeding clause, wherein the at least one lobe of the set of lobes corresponds to a radius of curvature of the composite spar at one of the first lobe end or the second lobe end.

The turbine engine of any proceeding clause, wherein at least a portion of two lobes of the set of lobes overlap.

The turbine engine of any proceeding clause, wherein the first lobe end is spaced from the bottom portion of the sleeve.

The turbine engine of any proceeding clause, wherein the composite spar includes a base extending from the bottom portion to the first lobe end.

The turbine engine of any proceeding clause, wherein the base includes a concave portion.

The turbine engine of any proceeding clause, wherein the sleeve defines a sleeve centerline and the base of the composite spar includes a linear portion, wherein a spar exterior surface of the composite spar is parallel to the sleeve centerline.

The turbine engine of any proceeding clause, wherein base length is measured from a bottom of the bottom portion to the first lobe end and wherein the base length is in a range of 2%-50% of the sleeve length.

The turbine engine of any proceeding clause, wherein the sleeve comprises a metallic material.

The turbine engine of any proceeding clause, wherein the airfoil body includes a polymer matrix composite material.

The turbine engine of any proceeding clause, wherein the set of lobes includes at least two lobes.

The turbine engine of any proceeding clause, wherein the set of lobes includes at least two lobes.

The turbine engine of any proceeding clause, wherein the composite spar has a first spar layup and a second spar layup separate from the first spar layup, wherein at least part of the first spar layup and the second spar layup abut.

The turbine engine of any proceeding clause, wherein the first spar layup and the second spar layup comprise the same material.

The turbine engine of any proceeding clause, wherein an abutment is defined where the at least part of the first spar layup and the second spar layup abut, and the abutment is located at a lobe in the set of lobes.

The turbine engine of any proceeding clause, wherein the first spar layup and a second spar layup comprise the same material.

The turbine engine of any proceeding clause, wherein a cross-sectional shape of at least one lobe in the set of lobes varies along the lobe length.

The turbine engine of any proceeding clause, wherein a number of recesses in the set of recesses is greater than a number of lobes in the set of lobes.

The turbine engine of any proceeding clause, wherein a material different than that of the composite spar is wedged in at least one recess in the set of recesses.

The turbine engine of any proceeding clause, wherein the set of lobes is additively manufactured to the composite spar.

The turbine engine of any proceeding clause, wherein the set of lobes is asymmetrical about the sleeve centerline.

The turbine engine of any proceeding clause, wherein each recess in the set of recesses receives a corresponding lobe in the set of lobes.

The turbine engine of any proceeding clause, wherein the set of recesses is a first set of recesses and the sleeve inner surface further has a second set of recesses extending from the bottom portion to the first lobe end and receives the base.

The invention claimed is:
1. An airfoil assembly for a turbine engine, the airfoil assembly comprising:

an airfoil body comprising an outer wall bounding an interior, the outer wall extending between a leading edge and a trailing edge in a chordwise direction, and between a root and a tip in a spanwise direction;

a composite spar having an interior spar portion located at the interior of the airfoil body and an exterior spar portion exterior of the airfoil body;

a sleeve having a sleeve outer surface and a sleeve inner surface, wherein at least part of the exterior spar portion of the composite spar is received at the sleeve inner surface, and wherein a top portion and a bottom portion extend from the sleeve outer surface to the sleeve inner surface, a sleeve length measured in the spanwise direction from the bottom portion to the top portion; and a set of lobes extending from the composite spar received by a set of recesses at the sleeve inner surface, wherein the set of lobes include a lobe length measured in the spanwise direction from a first lobe end to a second lobe end, wherein the lobe length is 10% or more of the sleeve length.

2. The airfoil assembly of claim 1, wherein each lobe of the set of lobes includes an extension length measured from a recessed arc to a lobe peak.

3. The airfoil assembly of claim 2, wherein the extension length changes along the lobe length.

4. The airfoil assembly of claim 2, wherein the set of lobes has a tapered configuration where the extension length is zero at one of the first lobe end or the second lobe end.

5. The airfoil assembly of claim 1, further comprising a set of troughs circumferentially spaced about the composite spar, wherein each trough of the set of troughs is defined between two adjacent lobes of the set of lobes.

6. The airfoil assembly of claim 5, wherein the set of troughs define, in part, a recessed arc.

7. The airfoil assembly of claim 1, wherein at least one lobe of the set of lobes includes a changing radius of curvature along the lobe length.

8. The airfoil assembly of claim 7, wherein the at least one lobe of the set of lobes corresponds to a radius of curvature of the composite spar at one of the first lobe end or the second lobe end.

9. The airfoil assembly of claim 1, wherein at least a portion of two lobes of the set of lobes overlap.

10. The airfoil assembly of claim 1, wherein the first lobe end is spaced from the bottom portion of the sleeve.

11. The airfoil assembly of claim 1, wherein the composite spar includes a base extending from the bottom portion to the first lobe end.

12. The airfoil assembly of claim 11, wherein the base includes a concave portion.

13. The airfoil assembly of claim 11, wherein the sleeve defines a sleeve centerline and the base of the composite spar includes a linear portion, wherein a spar exterior surface of the composite spar is parallel to the sleeve centerline.

14. The airfoil assembly of claim 1, wherein a base length is measured from a bottom of the bottom portion to the first lobe end and wherein the base length is in a range of 2%-50% of the sleeve length.

15. The airfoil assembly of claim 1, wherein the sleeve comprises a metallic material.

16. The airfoil assembly of claim 15, wherein the airfoil body includes a polymer matrix composite material.

17. The airfoil assembly of claim 1, wherein the set of lobes includes at least two lobes.

18. The airfoil assembly of claim 1, wherein the set of lobes includes at least four lobes.

19. The airfoil assembly of claim 1, wherein the composite spar has a first spar layup and a second spar layup separate from the first spar layup, wherein at least part of the first spar layup and the second spar layup abut.

20. The airfoil assembly of claim 19, wherein the first spar layup and the second spar layup comprise a same material.

\* \* \* \* \*